(12) United States Patent
Kurtakov

(10) Patent No.: US 8,495,614 B2
(45) Date of Patent: Jul. 23, 2013

(54) MECHANISM FOR DYNAMICALLY GENERATING SPEC FILES FOR SOFTWARE PACKAGE MANAGERS

(75) Inventor: Aleksandar Dragomirov Kurtakov, Pazardzhik (BG)

(73) Assignee: Red Hat, Inc., Raleigh, NC (US)

( * ) Notice: Subject to any disclaimer, the term of this patent is extended or adjusted under 35 U.S.C. 154(b) by 454 days.

(21) Appl. No.: 12/789,756

(22) Filed: May 28, 2010

(65) Prior Publication Data

US 2011/0296396 A1    Dec. 1, 2011

(51) Int. Cl.
*G06F 9/44* (2006.01)
*G06F 9/445* (2006.01)

(52) U.S. Cl.
USPC .................. 717/171; 717/170; 717/174

(58) Field of Classification Search
None
See application file for complete search history.

(56) References Cited

U.S. PATENT DOCUMENTS

| | | | |
|---|---|---|---|
| 7,171,659 B2 * | 1/2007 | Becker et al. | 717/171 |
| 7,222,341 B2 * | 5/2007 | Forbes et al. | 717/170 |
| 7,478,385 B2 * | 1/2009 | Sierer et al. | 717/174 |
| 7,549,148 B2 * | 6/2009 | Cross et al. | 717/174 |
| 7,676,448 B2 * | 3/2010 | Henderson et al. | 717/171 |
| 7,779,404 B2 * | 8/2010 | Movassaghi et al. | 717/174 |
| 2003/0177178 A1 * | 9/2003 | Jones et al. | 709/203 |
| 2004/0059703 A1 * | 3/2004 | Chappell et al. | 707/1 |
| 2004/0255291 A1 * | 12/2004 | Sierer et al. | 717/174 |
| 2005/0055315 A1 * | 3/2005 | Darweesh et al. | 705/59 |
| 2005/0066324 A1 * | 3/2005 | Delgado et al. | 717/170 |
| 2005/0132356 A1 * | 6/2005 | Cross et al. | 717/174 |
| 2008/0320465 A1 * | 12/2008 | Kinder et al. | 717/170 |
| 2009/0271779 A1 * | 10/2009 | Clark | 717/171 |

OTHER PUBLICATIONS

Van der Storm, Tijs. Continuous release and upgrade of component-based software, Proceedings of the 12th international workshop on Software configuration management, 2005, pp. 43-57, Retrieved on [Mar. 21, 2013] Retrieved from the Internet: URL<http://dl.acm.org/citation.cfm?id=1109132>.*

Miller, T. Using the RPM package manager for (LA)TEX packages, TUGboat, vol. 26 No. 1, 2005, pp. 17-28, Retrieved on [Mar. 21, 2013] Retrieved from the Internet: URL<http://cta.tug.org/TUGboat/Articles/tb26-1/tb82miller-rpm.pdf>.*

* cited by examiner

*Primary Examiner* — Thuy Dao
*Assistant Examiner* — Cheneca Smith
(74) *Attorney, Agent, or Firm* — Lowenstein Sandler LLP

(57) ABSTRACT

A mechanism for dynamically generating spec files for software package managers is disclosed. A method of embodiments of the invention includes extracting, via a file developer at an application server of a computer system, file information from project files of a software package tool associated with a software application, the file information relating to the software application, and generating, via the file developer, a package spec file using the extracted file information such that the package spec file is compatible with the software application.

15 Claims, 4 Drawing Sheets

MECHANISM FOR DYNAMICALLY GENERATING SPEC FILES FOR SOFTWARE PACKAGE MANAGERS

TECHNICAL FIELD

The embodiments of the invention relate generally to software packaging and, more specifically, relate to a mechanism for dynamically generating spec files for software package managers.

BACKGROUND

A software package system is used to install, uninstall, configure, and update (collectively referred to as "package acts") a software package (also referred to as "software application") on a computer system with relative ease and consistency. A software package system typically includes a first sub-system that includes a software package on which these package acts are to be performed and a software package tool to hold relevant information about the software package, and a second sub-system including a software package manager (e.g., Red Hat package manager ("RPM") package manager) ("RPM package manager", a recursive acronym) and a corresponding .spec file ("spec file").

A spec file contains relevant information in a particular format to help a package manager facilitate package acts on a software package. Further, a spec file is an important part of RPM building process and, for example, helps a package manager direct how a software package is to be configured, what files and where are to be installed, and what system-level activities need to occur before and after a package act is to be performed, etc. A spec file includes multiple sections of information and values relating to identification and characteristics of a software package that is part of a software package system and on which package acts are to be performed. Although there are certain characteristics that are shared by any number of software packages, since each software package has its own identification and particular characteristics, a compatible spec file is needed for each software package so that the relevant package acts can be performed. However, today's conventional techniques for generating spec files involve manual and inefficient processes for generating spec files and, given the need for generating a separate and compatible spec file for each software package, such conventional techniques turn into convoluted and cumbersome processes.

Conventional techniques involve processes that are slow, tedious, and inefficient and require a great amount of human time to be invested by, for example, a software developer/programmer. In addition, these conventional techniques are error-prone, primarily due to the human factor which is an integral part of manual generation of spec files. Of course, for any spec file to work, these errors have to be corrected, which requires additional human time and labor. Moreover, in conventional techniques, the information that is needed to generate a spec file is obtained from diverse sources that may contain errors of its own, which, again, requires additional investment of developer/programmer time and labor.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Embodiments of the invention provide for dynamically generating spec files for software package managers. A method of embodiments of the invention includes extracting, via a file developer at an application server of a computer system, file information from project files of a software package tool associated with a software application, the file information relating to the software application, and generating, via the file developer, a package spec file using the extracted file information such that the package spec file is compatible with the software application.

The technique for generation of spec files for software package managers (e.g., RPM package manager), in one embodiment, provides for a extracting spec file-related information from various project files (that are known to contain such information) and using the extracted information to generate package spec files (e.g., RPM package spec files). This smart and dynamic spec file generation technique eliminates the need for using manual, error-prone, tedious, and inefficient spec file development processed that require a great deal of human time and labor to generate spec files and then, require additional human time and labor to correct errors within generated spec files that are primarily due to human factor.

Figure 1:
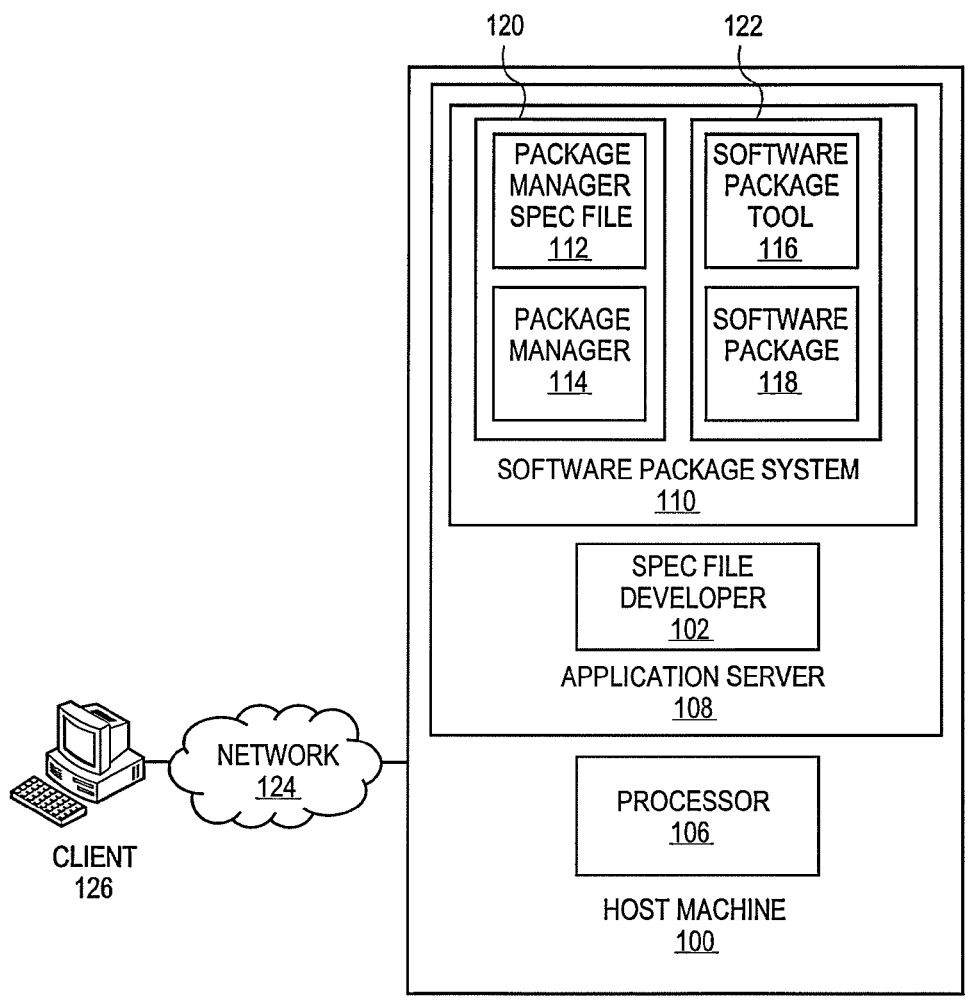
FIG. 1 illustrates a host machine implementing a software package system according to one embodiment of the invention.

FIG. 1 illustrates a host machine 100 implementing a software package system 110 according to one embodiment of the invention. Host machine 100 hosts an application server 108 and a processor 106. Host machine 100 may further include other physical resources similar to the ones illustrated in the computer system of FIG. 4. Host machine 100 is shown to be in communication a client computer system 126 over a network 124 such that a software package system 110 (along with its corresponding software package 118 (e.g., software application)) may be distributed to an a user (e.g., an end-user, such as a consumer who purchases the software package 118) via the client 126 over the network 124. Similarly, a user (e.g., an authorized user, such as a software developer, software programmer, system administrator, etc.) may access the software package system 110 via the client 126 over the network 124.

Software package system 110 includes a package manager spec file 112 that is associated with a package manager 114 (e.g., RPM package manager) to form a first package 120. A second package 122 includes the software package tool ("package tool") 116 and the corresponding software package 118. The two packages 120, 122 are then combined to form the software package system 110 that is then distributed to end-users (via one or more clients 126 over one or more networks 124) who not only receive software package 118, but also receive the rest of the software package system 110 to help perform relevant package acts on the software package 118 on a computer system, such as client 126. In one embodiment, Application server 102 further employs a spec file developer 102 that is used to generate the package manager spec file 112. In one embodiment, spec file developer 102

(e.g., RPM package manager spec file developer) provides a user interface for the user, such as a software developer, to, for example, access and manipulate information contain within various project files (e.g., Project Object Model ("POM") files) of software package tool 116 (e.g., Apache Maven® ("Maven") of Apache Software Foundation) and/or within package manager spec file 112 (e.g., RPM package manager spec files), etc. Various components of the spec file developer 102 may reside at (and be accessed from) a memory device of the host machine 100. For brevity and simplicity, throughout this document, RPM package manager, RPM package manager spec files, Apache Maven, POM files, etc., are used as examples and that the embodiments of the invention are not limited to them. Spec file developer 102 is further described with reference to FIG. 2.

Figure 2:
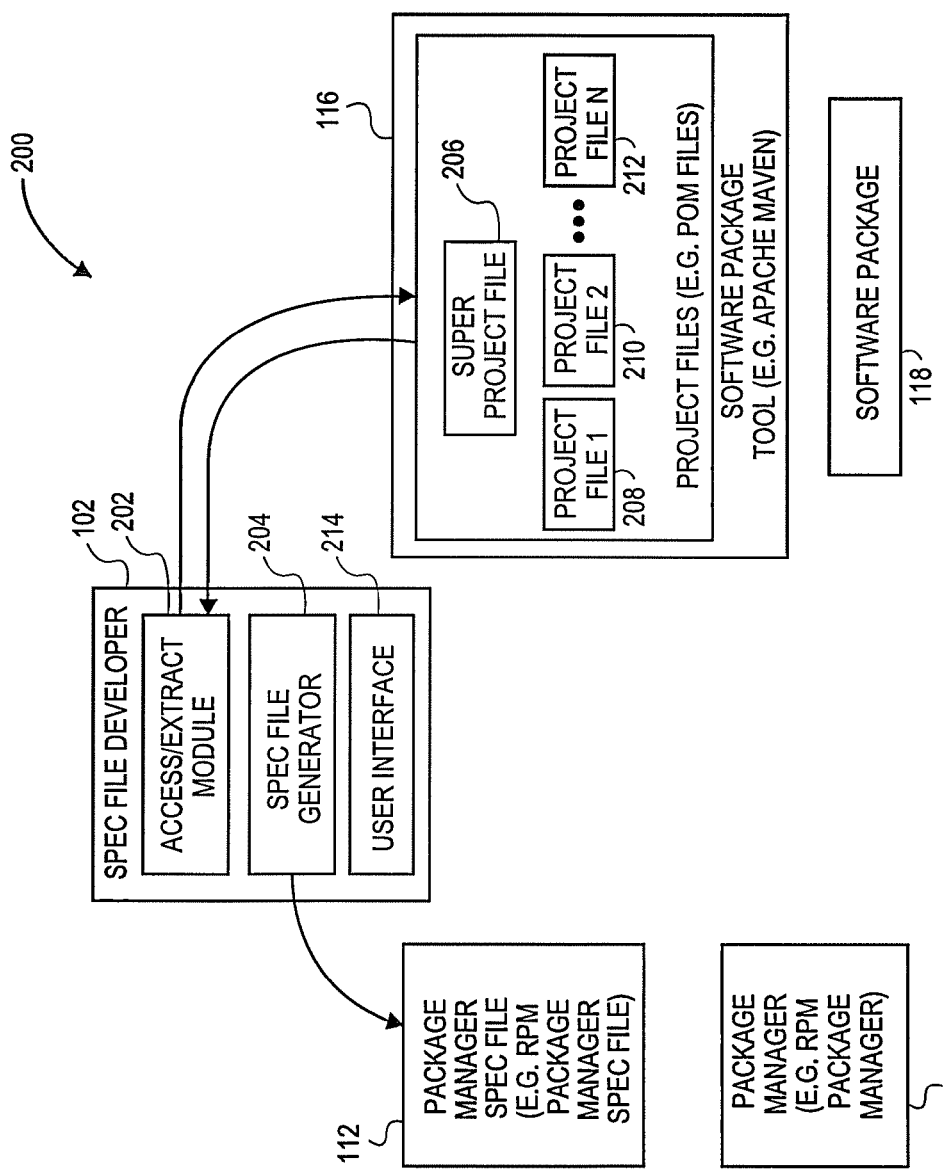
FIG. 2 illustrates a mechanism for automatically and dynamically generating a package manager spec file according to one embodiment of the invention.

FIG. 2 illustrates a mechanism 200 for automatically and dynamically generating a package manager spec file 112 according to one embodiment of the invention. Software package tool 116 (e.g., Apache Maven) is associated with a software package (e.g., software application) 118 on which package acts are to be performed. Package tool 116 refers to a software tool for building and managing software packages. Package tool 116 includes project files 206-212 (e.g., POM files) that contain identification description and characteristic information relating to its associated software package 118.

Each project file 206-212 may include an Extensible Markup Language (XML) file (e.g., pom.xml) holding the relevant identification description and characteristic information. For example, super project file 206 contains default information that is common to most software packages, while each project file 206-212 contains identification description and characteristic information relating to a specific software package 118. Identification description refers to software package identifying information, including name, version number, brief description, vendor information, release date, copyright information, and the like, relating to software package 118. Configuration information refers to relatively complex configuration information and values (e.g., software dependencies, build profiles, etc.) relating to software package 118. More specifically, each project file 206-212 contains necessary identification description and/or configuration information (that is particular to a software package 118) to generate and/or populate various sections of spec file 112 so it is compatible to its corresponding software package 118. Some of the sections of spec file 112 include a preamble, a prep section, a setup section, an install section, install/uninstall scripts, a files section, a clean section, etc. Once generated, a spec file 112 is then associated with its software package manager 114 to be provided as an integral part of a software package system (e.g., RPM software package system) that also includes a corresponding set of software package 118 (e.g., RPM software package) and package tool 116.

In one embodiment, as illustrated, mechanism 200 employs a spec file developer 102 to automatically and dynamically generate a spec file 112 relating to a software package 118 by directly accessing and extracting relevant identification description and configuration information from project files 206-212 of a package tool 116. In one embodiment, spec file developer 102 includes a user interface 214 to provide a user (e.g., software developer, etc.) an interface to access and manipulate information, such as information contained within project spec files 206-212 and/or package manager spec file 112, etc. Further, the user, utilizing the user interface 214, can control and modify access/extract module 202, spec file generator 204, etc., as necessitated or desired. User interface 214 is provided to the user via a server computer system and/or a client computer system.

Spec file developer 102, in one embodiment, further includes an access/extract module 202 to access the identification description and configuration information (relating to the software package 118) at the project files 206-212 and then, to extract that identification description and configuration information from those project files 206-212. In one embodiment, a user identifies the software package 118 and based on that identification, the access/extract module 202 probes the project files 206-212 to access and extract the relevant identification description and configuration information corresponding to the identified software package 118. In another embodiment, a user identifies the project files 206-212 and based on that identification, a access/extract module 202 accesses the identified project files 206-212 to access and extract the relevant identification description and configuration information corresponding to the software package 118.

The extracted identification description includes identification information, such as name, brief description, version, release information, copyright information, etc., associated with the software package 118 and is used to populate the preamble of the spec file 112 so that the software package 118 can be identified. For example, name refers to a name that is assigned to the software package 118 for identification purposes; similarly, version refers to a version number (e.g., version 1.1) of the software package 118, release information refers to the number of times the software package 118 has been packaged, and copyright information refers to any legal copyright information relating to the software package 118, etc.

Similarly, the extracted configuration information relating to the configuration setting and requirements of the software package 118 is used to generate other sections of the spec file 112, such as the prep section that can then be used by the package manger 114 to prepare the software package 118 for package acts, the build section for building the software package 118, the install section to facilitate installation of the software package 118, and the like.

In addition to having the access/extract module 202, the spec file developer 102 further includes a spec file generator 204 to use the extracted identification description and configuration information to dynamically and automatically generate the spec file 112 such that the spec file 112 corresponds to and remains compatible with the software package 118 to facilitate successful performance and completion of any relevant package acts. In one embodiment, the spec file generator 204 generates each aforementioned section of the spec file 112 and then inputs the extracted identification description and configuration information in them; while, in another embodiment, the spec file generator 204 automatically populates the spec file sections that are provide as a template.

Once the spec file 112 is generated, it is then verified for content, in case a software developer chooses to modify the content of the spec file 112. This content verification process may include verifying the content for accuracy (e.g., correcting minor errors, supplying missing information, etc.) or modifying the content for any variety of reasons. Once the spec file 112 is verified, it is then associated with its corresponding package manager 114 that uses the content of the spec file 112 to facilitate package acts on the software package 118.

Spec file developer 102 may be associated with a graphical user interface (GUI)-based platform to provide a user-friendly display of the spec file content via a display device to a user (e.g., software developer) for easy review and verification of the spec file 112. Furthermore, spec file developer 102 may include other components and modules to remain compatible and workable with any number of hardware/software components to facilitate certain tasks, such as using a package repository (not shown) to store all or part of the extracted identification description, configuration information, other information retrieved from project files 108-114, or any other relevant information.

Figure 3:
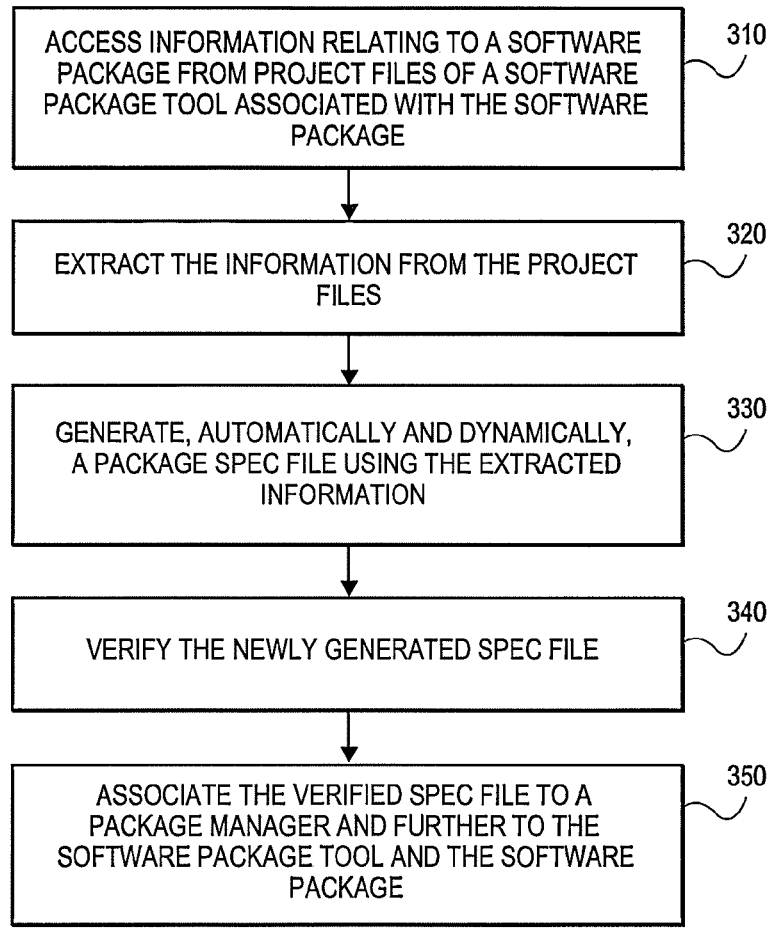
FIG. 3 illustrates a method for automatically and dynamically generating a software package spec file according to one embodiment of the invention.

FIG. 3 illustrates a method 300 for automatically and dynamically generating a software package spec file according to one embodiment of the invention. Method 300 may be performed by processing logic that may comprise hardware (e.g., circuitry, dedicated logic, programmable logic, microcode, etc.), software (such as instructions run on a processing device), or a combination thereof. In one embodiment, method 300 is performed by spec file developer of FIG. 1.

Method 300 begins at block 310 where access/extract module of a spec file developer accesses project files of a software package tool associated with a software package to extract relevant identification description and configuration information relating to the software package. At block 320, the accessed identification description and configuration information is extracted by the access/extract module. This extracted identification description and configuration information may be temporarily stored at a package repository. At block 330, in one embodiment, spec file generator of the spec file developer automatically and dynamically generates a package manager spec file, using the extracted identification description and configuration information, such that the spec file is particular to and remains compatible the software package. In one embodiment, spec file developer provides a user interface to the use to access and manipulate information, such as information contained within project spec files and/or package manager spec file, etc. Further, the user, utilizing the user interface, can control and modify access/extract module, spec file generator, etc., as necessitated or desired. User interface is provided to the user via a server computer system and/or a client computer system. At block 340, once the spec file is generated, it can be chosen to be verified and/or modified by a software developer, as previously described. After verification and/or modification, at block 350, the software package spec file is associated with its corresponding package manager for distribution as part of a software package system, which includes the corresponding software package and its associated software package tool whose project files were accessed to extract the relevant identification description and configuration information.

Figure 4:
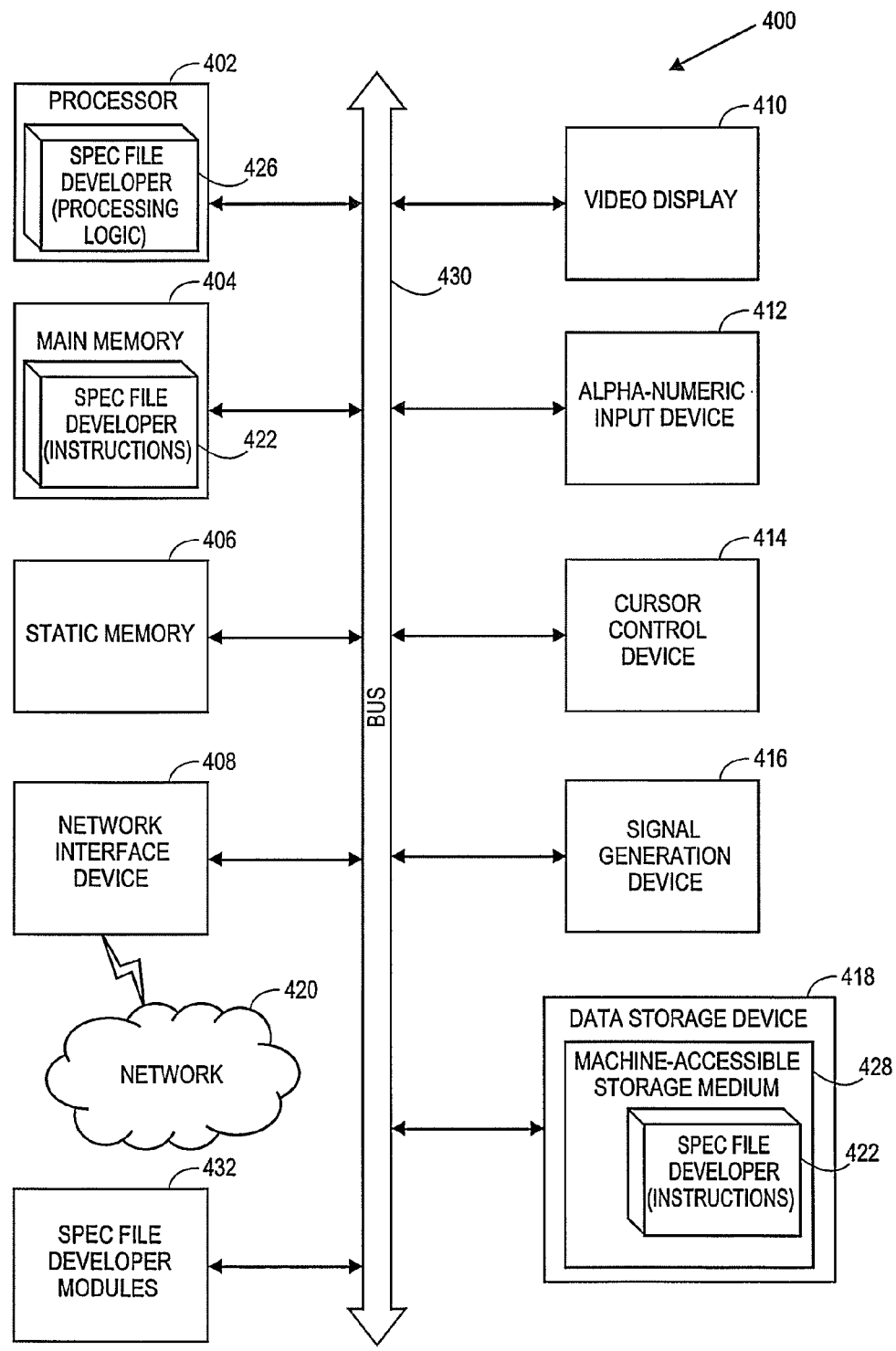
FIG. 4 illustrates one embodiment of a computer system.

FIG. 4 illustrates a computer system 400 for dynamically generating spec files for software package managers according to one embodiment of the invention. Within the computer system 400 is a set of instructions for causing the machine to perform any one or more of the methodologies discussed herein. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, random access memory (RAM), dynamic RAM (DRAM) such as synchronous DRAM (SDRAM), DRAM (RDRAM), etc.), a static memory 406 (e.g., flash memory, static random access memory (SRAM), etc.), and a secondary memory 418 (e.g., a data storage device in the form of a drive unit, which may include fixed or removable machine-accessible or computer-readable storage medium), which communicate with each other via a bus 430.

Processing device 402 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. Processing device 402 is configured to execute the processing logic 426 for performing the operations and methods discussed herein.

The computer system 400 may further include a network interface device 408. The computer system 400 also may include a video display unit 410 (e.g., a liquid crystal display (LCD) or a cathode ray tube (CRT)) connected to the computer system through a graphics port and graphics chipset, an alphanumeric input device 412 (e.g., a keyboard), a cursor control device 414 (e.g., a mouse), and a signal generation device 416 (e.g., a speaker).

The data storage device 418 may include a machine-accessible storage medium (or a computer-readable storage medium) 428 on which is stored one or more sets of instructions 422 (e.g., spec file developer) embodying any one or more of the methodologies or functions described herein. The spec file developer may also reside, completely or at least partially, within the main memory 404 (e.g., spec file developer (instructions) 422) and/or within the processing device 402 (e.g., spec file developer (processing logic) 426) during execution thereof by the computer system 400, the main memory 404 and the processing device 402 also constituting machine-readable storage media. Further, for example, the spec file developer instructions 422 may be transmitted or received over a network 420 via the network interface device 408.

The machine-readable storage medium 428 may also be used to store the spec file developer (instructions) 422 persistently. While the machine-accessible storage medium 428 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

Spec file developer modules 432, components and other features described herein (for example in relation to FIG. 1) can be implemented as discrete hardware components or integrated in the functionality of hardware components such as ASICS, FPGAs, DSPs or similar devices. In addition, the modules 432 can be implemented as firmware or functional circuitry within hardware devices. Further, the modules 432 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "extracting", "generating", "accessing", "creating", "verifying", "associating", "manipulating", "modifying", "performing", "providing", "identifying", "populating", "associating", "using", "installing", "uninstalling", "configuring", "updating", "analyzing", "querying", "updating", "providing", "storing", "saving" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display device.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a machine readable storage medium, such as, but not limited to, any type of disk including floppy disks, optical disks, magnetic-optical disks, ROMs, compact disk ROMs (CD-ROMs), RAMs, erasable programmable ROMs (EPROMs), electrically EPROMs (EEPROMs), magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., ROM, RAM, magnetic disk storage media, optical storage media, flash memory devices, etc.), a machine (e.g., computer) readable transmission medium (non-propagating electrical, optical, or acoustical signals), etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A computer-implemented method comprising:

extracting, via a file developer at an application server of a computer system, file information from project files of a software package tool associated with a software application, the file information relating to the software application; and generating, via the file developer, a package spec file using the extracted file information, the package spec file being compatible with the software application, wherein the package spec file comprises sections of information relating to characteristics of the software application, and wherein the package spec is part of a software package comprising the software package tool and the software application, wherein the generating comprises generating a plurality of sections of the package spec file, and populating the plurality of sections with the extracted file information from the project files.

2. The computer-implemented method of claim 1, further comprising prior to extracting, accessing, via the file developer, the file information at the project files of the software package tool.

3. The computer-implemented method of claim 1, wherein the file information from the project files comprises identification information identifying the software package and configuration information providing configuration requirements of the software package.

4. The computer-implemented method of claim 1, further comprising associating the package spec file with a package manager, the package manager to, using the extracted file information populated into the package spec file, perform package acts on the software package.

5. The computer-implemented method of claim 4, wherein the package acts comprise at least one of installing, uninstalling, configuring, or updating the software package.

6. A system comprising:

a memory;

a processing device communicably coupled to the memory; and an application server executable from the memory by the processing device, the application server comprising a spec file developer to:

extract file information from project files of a software package tool associated with a software application capable of executing on the application server, the file information relating to the software application, and generate a package spec file using the extracted file information, the package spec file being compatible with the software application, wherein the package spec file comprises sections of information relating to characteristics of the software application, and wherein the package spec is part of a software package comprising the software package tool and the software application, wherein the generating comprises generating a plurality of sections of the package spec file, and populating the plurality of sections with the extracted file information from the project files.

7. The system of claim 6, wherein the spec file developer is further to, prior to the extracting, access the file information at the project files of the software package tool.

8. The system of claim 6, wherein the file information from the project files comprises identification information identifying the software package and configuration information providing configuration requirements of the software package.

9. The system of claim 6, wherein the spec file developer is further to associate the package spec file with a package manager, the package manager to, use the extracted file information populated into the package spec file, perform package acts on the software package.

10. The system of claim 9, wherein the package acts comprise at least one of installing, uninstalling, configuring, or updating the software package.

11. A non-transitory machine-readable storage medium including data that, when accessed by a processing device, cause the processing device to perform operations comprising:

extracting, via a file developer at an application server executed by the processing device, file information from project files of a software package tool associated with a software application, the file information relating to the software application; and generating, via the file developer, a package spec file using the extracted file information, the package spec file being compatible with the software application, wherein the package spec file comprises sections of information relating to characteristics of the software application, and wherein the package spec is part of a software package comprising the software package tool and the software application, wherein the generating comprises generating a plurality of sections of the package spec file, and populating the plurality of sections with the extracted file information from the project files.

12. The non-transitory machine-readable storage medium of claim 11, further having instructions that, when executed, cause the processing device to perform operations comprising prior to extracting, accessing, via the file developer, the file information at the project files of the software package tool.

13. The non-transitory machine-readable storage medium of claim 11, wherein the file information from the project files comprises identification information identifying the software package and configuration information providing configuration requirements of the software package.

14. The non-transitory machine-readable storage medium article of manufacture of claim 11, further having instructions that, when executed, cause the processing device to perform operations comprising associating the package spec file with a package manager, wherein the package manager to, using the extracted file information populated into the package spec file, perform package acts on the software package.

15. The non-transitory machine-readable storage medium of claim 14, wherein the package acts comprise at least one of installing, uninstalling, configuring, or updating the software package.

* * * * *